June 25, 1946.   C. A. POEKEL   2,402,770
ANTI-ICING MEANS FOR AIRCRAFT PROPELLERS
Filed Aug. 21, 1943
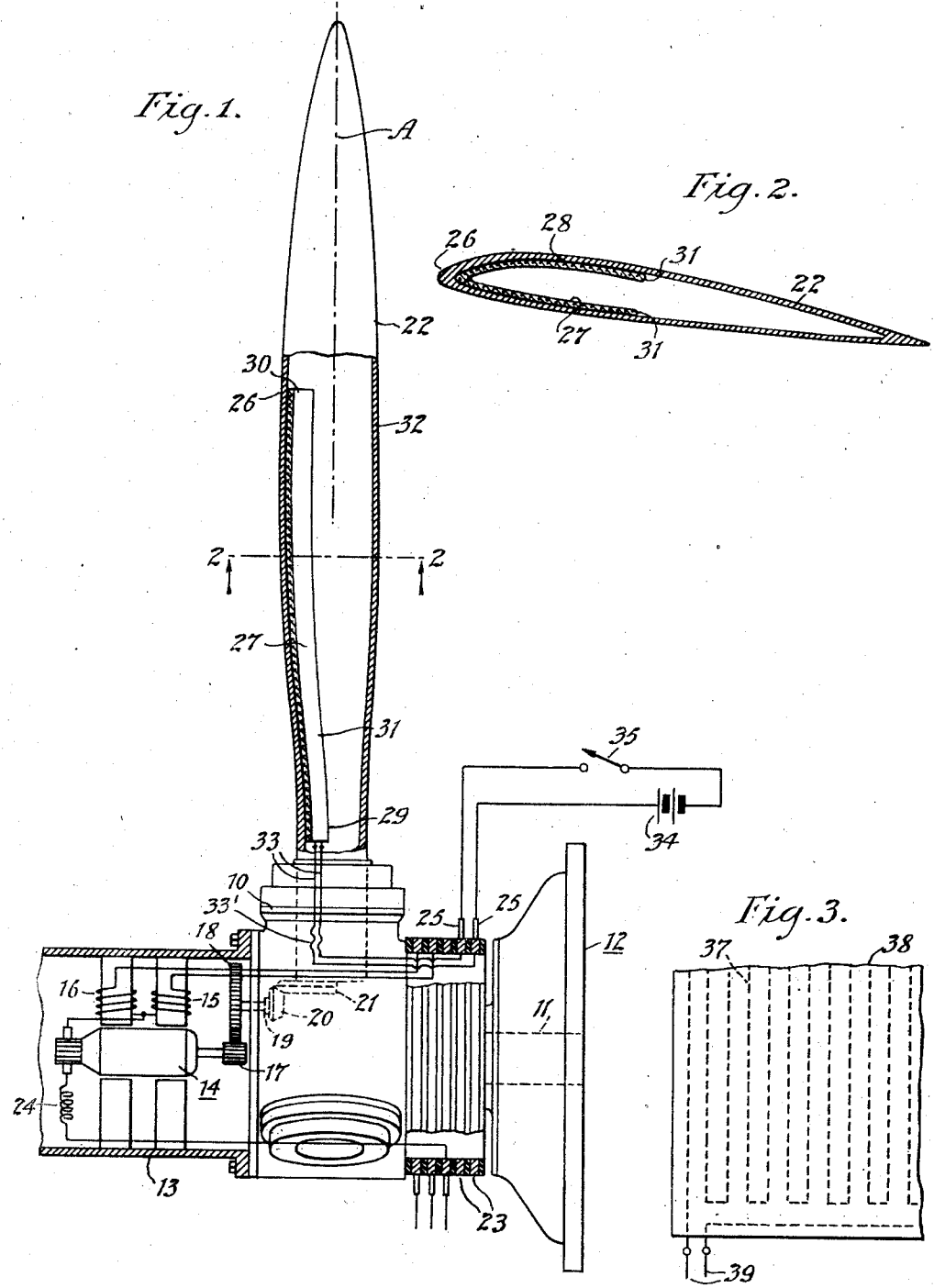
INVENTOR
Charles A. Poekel
BY
ATTORNEY Patented June 25, 1946

2,402,770

UNITED STATES PATENT OFFICE 2,402,770

ANTI-ICING MEANS FOR AIRCRAFT PROPELLERS

Charles A. Poëkel, West Caldwell, N. J., assignor to Curtiss-Wright Corporation, a corporation of Delaware Application August 21, 1943, Serial No. 499,739

2 Claims. (Cl. 244—134)

This invention relates to aircraft propellers and more particularly to an anti-icing or de-icing system for the blades of such propellers.

More specifically, the invention relates to a fabricated metal propeller wherein the hollow blades thereof are each provided with an internal heat generating element adapted to heat a selected portion of each blade sufficiently to obviate the formation of ice thereon while in flight under abnormal atmospheric conditions.

Accordingly, the primary object of the invention is to heat a selected portion of each propeller blade to prevent the formation of ice thereon, particularly in the leading edge region thereof.

A further object of the invention is to provide each blade of a controllable pitch aircraft propeller with an anti-icing means which will not detract from the efficiency of the propeller as such and which will not interfere with pitch changing operations.

Another object of the invention is to provide an anti-icing means for aircraft propellers, as specified, wherein the anti-icing means forms a permanent part of each propeller blade.

A further object of the invention is to provide an anti-icing means as an integral part of each blade of a propeller, as specified, which is light in weight, requires no servicing, and does not interfere with the accurate balancing of each blade and/or the accurate balancing of a complete propeller assembly.

Another object of the invention is to provide an anti-icing means for the blades of a controllable pitch aircraft propeller which does not interfere with the servicing of the pitch change mechanism or the substitution of one blade for another.

With the above and other objects in view, the invention resides in the novel construction, combination, and arrangement of parts, the novel features of which are set forth with particularity in the appended claims. The invention itself, however, both as to its organization and its method of operation, together with additional objects and advantages thereof, will best be understood from the following description of a specific embodiment, when taken in connection with the accompanying drawing, in which:

Figure 1 is a schematic view, partly in section and partly broken away, of a controllable pitch change propeller assembly as associated with a motor, one blade only of the propeller being shown;

Fig. 2 is a sectional view taken on the line 2—2 of Fig. 1; and

Fig. 3 is a fragmentary diagrammatic view of the heating element per se.

Referring to the drawing and particularly to Fig. 1, a propeller blade receiving hub 10 is shown mounted on the drive shaft 11 of an aircraft engine generally indicated at 12. A housing 13, shown attached to the hub 10 in axial alignment therewith, carries a pitch changing motor 14 with the windings 15 and 16 thereof shown associated with the motor magnetic structure.

The armature of the motor 14 is provided with a pinion gear 17 which meshes with a gear 18 carried on one end of a suitably journalled shaft 19. The other end of the shaft 19 is provided with a bevelled gear 20 which meshes with a toothed segment 21 secured to the root end of a propeller blade 22.

A plurality of slip rings 23 rotatable with the hub 10 are carried on the rear end portion thereof in insulated spaced relation. The terminal ends of the windings 15 and 16 and the conductor 16 leading from a coil winding 24, are connected to the respective slip rings 23, the conductors aforesaid, including fixed contact members 25 having engagement with said slip rings 23 all in a manner and for a purpose well known in the art.

In accordance with the invention, a hollow propeller blade 22 having a leading edge 26 and shown, by way of example, mounted in the hub 10 is provided with an electrical element adapted for generating heat when energized. The said element is preferably, although not necessarily, in the form of a woven, insulated wire mesh heating pad 27 and may partake of a configuration which is most suitable for proper placement within the blade 22.

More specifically, a heating pad as aforesaid, is bonded to a selected area within said blade 22 as by means of a suitable cement or other adhesive compound, in heat transfer relation.

In carrying out the invention, the heating pad 27 is first coated on one side thereof with a suitable cement or bonding material as indicated at 28 and then inserted in the interior of the hollow blade 22 along the leading edge area thereof. After the pad 27 has been properly positioned on the selected area within said blade 22, an air bag, for example, is placed in the blade and subsequently inflated, whereby the pad 27 is forced into intimate contact with the surface of said selected area. After a suitable setting period, the air bag (not shown) is deflated and withdrawn.

Instead of coating the heating pad 27 with a bonding compound as aforesaid, the selected area within the hollow blade 22 may be coated, as by spraying with a bonding compound and the pad 27 subsequently placed in position within the blade and forced into intimate contact therewith. However, it may be desirable under certain conditions, to coat both the pad 27 and the selected area within the blade 22 with bonding compound. Or, instead of bonding the heating pad 27 directly to the selected area within the blade it may also be desirable to sandwich a section of fabric or the like between the surface of the selected area and the heating pad 27 without departing from the spirit of the invention.

The length of the heating pad 27 is so chosen that the lower end 29 thereof terminates adjacent the root or shank end of the blade 22 and the upper end 30 terminates adjacent the mid-section thereof.

The width of the pad 27 is such that the marginal edges 31 thereof extend inwardly from the leading edge area 26 toward the trailing edge 32 of the blade, or to a point substantially adjacent the neutral axis thereof as indicated by the reference line A as clearly shown in Fig. 1.

In order to establish a current path to and from the pad 27, a pair of suitable conductors 33 are shown connected to the lower end 29 of the pad 27 and with sufficient slack therein, as indicated at 33' to obviate damage to said conductors upon pitch change movement of the blade 22. These conductors are passed downwardly through the shank of the blade 22 in any suitable manner and then passed laterally, rearwardly to two of the slip rings 23. The stationary contact members 25 engage the respective slip rings 23 for current take-off. Circuit connections from a current source 34 through a manually operable switch 35 are made with the said contact members 25 for energizing the heating pad 27 when desirable.

Referring to Fig. 2, wherein a cross section of the blade 22 is shown, it will be observed that the heating element or pad 27 is bonded to the selected area within the interior of the blade, the said selected area being located along the leading edge 26 of the blade 22.

In its preferred form, the heating pad 27 is in one piece. However, it may be desirable, under certain conditions, to make the pad in two electrically joined sections or two individual units separately connected. It will be noted however, that the heating pad 27 is merely one form of any suitable electrical heating structure which may be employed in carrying out the invention. Therefore, the invention is not to be limited to an electrical heat generating structure since a suitable arrangement for generating heat by chemical action may also be utilized.

It should be observed that the pitch change mechanism herein disclosed, is merely a schematic illustration of one suitable form of mechanism for altering the pitch of the blades with which the heating element is associated. Therefore, it will be obvious to those skilled in the art, that the invention may be associated with propeller structures wherein the pitch of the blades is fixed.

Referring to Fig. 3, wherein a fragmentary diagrammatic view of the heating pad 27 is shown, it will be noted that the high resistance electrical element 37 in wire form, passes back and forth substantially throughout the entire area of the pad and in between the interstices of the fabric base 38, which is preferably of insulating material, with the wire turns in spaced relation. The free ends of the wire 37 terminate exteriorly of the pad 27 by means of the conductor members 39.

In view of the foregoing, it will be understood that, in the event of ice formation on a blade constructed in accordance with this invention, the switch 35 may be closed to energize the pad 27 associated with each blade 22 of a propeller as aforesaid, whereby the leading edge area of the said blade is heated to thereby relieve the blades of ice which may adhere thereto.

However, should an icing condition be known before it is encountered, the switch 35 may be closed to heat the blades in advance and obviate the deposition of ice thereon.

Therefore, the expression "de-icing" shall be understood as referring to true "de-icing" wherein ice is removed after its formation. On the other hand "anti-icing" shall be understood as referring to a condition wherein the formation of ice is obviated.

While there has been shown and described one specific embodiment of the invention, it is to be understood that the invention is susceptible of various modifications and therefore is not to be restricted except insofar as it is necessitated by the prior art and the spirit of the appended claims.

What is claimed as new, and desired to be secured by Letters Patent, is:

1. In combination, a propeller hub including a slip ring current transfer means, a hollow metallic propeller blade rotatably journalled in said hub, an electrical heating pad comprising joined layers of insulating fabric having a heating element therebetween positioned within said blade and intimately bonded to a selected area thereof in direct heat transfer relation, said heating pad extending along the leading edge region and across said blade to a point substantially adjacent the neutral axis of said blade, and means establishing a current path to and from said pad extending from said slip ring transfer means through said hub and into said blade.

2. In combination, a propeller hub including a slip ring current transfer means, a hollow metallic propeller blade rotatably journalled in said hub, an electrical heating pad comprising joined layers of insulating fabric having a heating element therebetween secured within said blade, said pad occupying the leading edge area of said blade with one end thereof terminating adjacent the shank end and the opposite end terminating adjacent the mid-section thereof, the side margins of said pad extending inwardly of said blade to a point substantially adjacent the neutral axis thereof, and a pair of flexible conductors extending from said slip ring transfer means through said hub and into said blade.

CHARLES A. POËKEL.